INVENTORS
RONALD MORINO
BERT WEISS

Dec. 2, 1969  B. WEISS ET AL  3,481,033
METHOD FOR FORMING ELECTRIC MOTOR ARMATURES
Filed Feb. 6, 1967  10 Sheets-Sheet 5
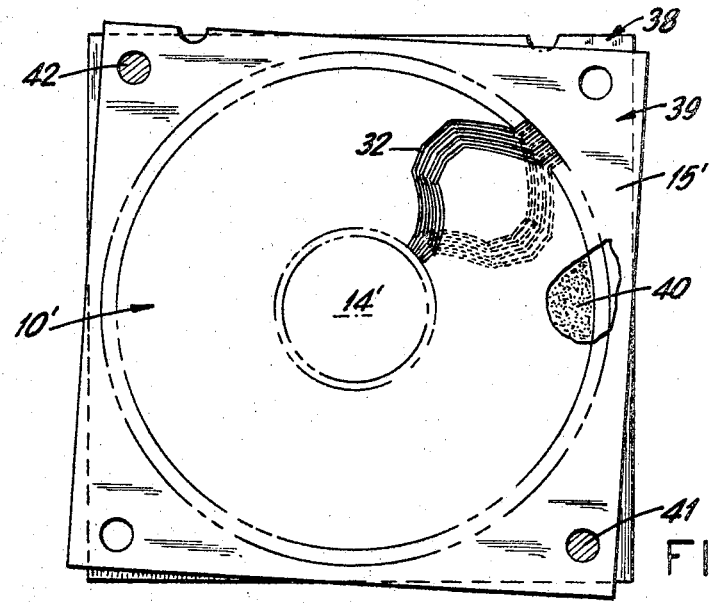
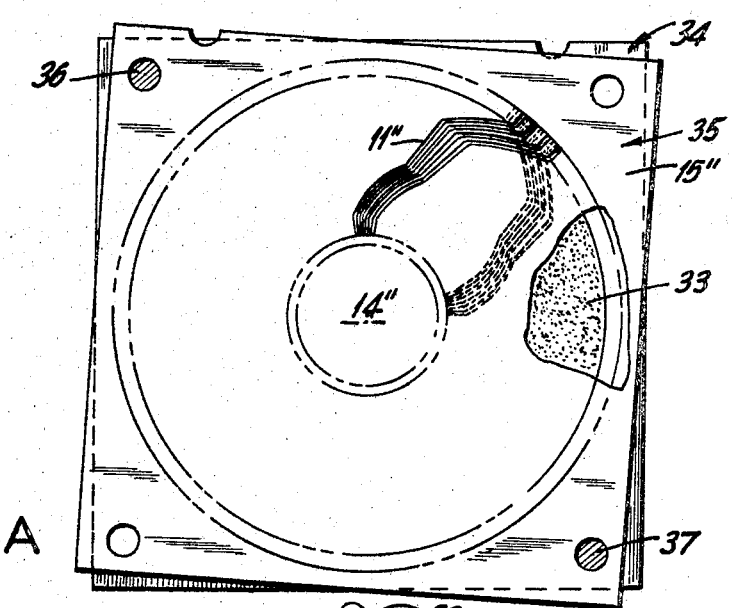
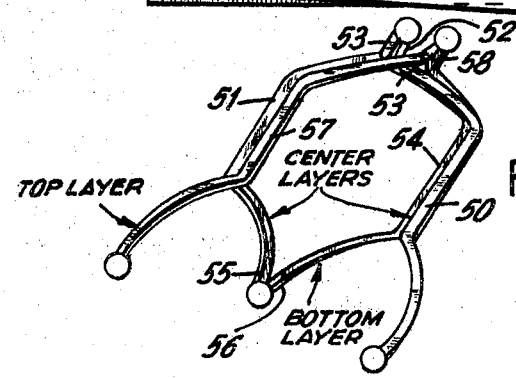
INVENTORS
RONALD MORINO
BERT WEISS INVENTORS
RONALD MORINO
BERT WEISS
BY
Morgan, Finnegan, Durham & Pine
ATTORNEYS

United States Patent Office 3,481,033
Patented Dec. 2, 1969

3,481,033
METHOD FOR FORMING ELECTRIC MOTOR ARMATURES
Bert Weiss, Northport, and Ronald Morino, Glen Cove, N.Y., assignors to Photocircuits Corporation, Glen Cove, N.Y., a corporation of New York
Filed Feb. 6, 1967, Ser. No. 614,201
Int. Cl. B23q 17/00; H02k 15/00
U.S. Cl. 29—598                                8 Claims

ABSTRACT OF THE DISCLOSURE

The method of, and punching press for, forming conductor pattern stamping for electric motor armatures. Metal blanks are clamped to a drive shaft by a universal clamp which eliminates eccentricities in rotation. The blanks are indexed and punched at a succession of stamping positions to remove metal between adjacent conductor segments. Alignment holes are punched into the blank at selected stamping positions to establish a flip-line used in subsequent assembly operations.

The motor armatures are assembled using at least two identical stampings oriented by the alignment holes and the flip-lines, bonding the aligned stampings to a dielectric disc, and welding aligned tabs of the stampings to form the armature interconnections.

BACKGROUND OF INVENTION

This invention relates to a technique for making electric motor armatures and more particularly to an improved method and apparatus for stamping the conductor patterns from a metal blank.

The earlier high acceleration, low inertia motors included armatures constructed using chemical printed circuit techniques, i.e., by metal depositing or metal etching. More recently, however, mechanical techniques have begun replacing the earlier chemical techniques whereby the armature is formed by stamping the conductor patterns from metal blanks, bonding the conductor patterns to a dielectric carrier and then welding the ends of the individual conductors to form the armature interconnections. The stampings used in forming the conductor patterns must be extremely precise since the spacing between adjacent conductors is on the order of a few thousandths of an inch and because the ends of the individual conductor segments in the two or more stampings used in forming the armature must be perfectly aligned in order to properly weld the interconnections.

In the past this has been accomplished by a two-step stamping process. In the first stamping operation a square hole is punched in the center of the metal blank and alignment holes are punched in the scrap metal near the edges of the blank. The conductor pattern is then formed in a second stamping operation by means of a notching press which removes the metal between adjacent conductors. In the notching press the blank is driven by means of a drive shaft passing through the square hole and in this manner an accurate conductor pattern is formed in precise registry with the alignment holes.

A two layer armature is formed using a pair of identical stampings, one stamping being rightside up and the other being inverted or upside down relative to the first. The alignment holes are diametrically opposed so that a line passing through the centers of the alignment holes passes precisely through the center of the conductor pattern. The line passing through the diametrically opposed pair of alignment holes is used as the flip-line for inverting one stamping relative to the other.

A four layer armature is normally constructed using two pairs of stampings, one pair of stampings providing the wave segments of the winding and the other providing the lap segments of the winding. The diametrically opposed alignment holes are used for positioning the two stampings providing the wave segments to form a two-layer subassembly, similar alignment holes are used for positioning the pair of stampings providing the lap segments, and the two-layer subassemblies are thereafter positioned relative to one another by means of the alignment holes.

BRIEF DESCRIPTION OF THE INVENTION

A general object of this invention is to provide a single step stamping technique for forming the conductor patterns to thereby improve production efficiencies. This is achieved by clamping the metal blank in the notching press without using a square drive hole in the blank, and by forming the alignment holes as part of the notching operation to thereby achieve precise alignment with the conductor pattern. This arrangement not only provides a significant labor saving by eliminating one step in the process, but also decreases set up time when interchanging stamping dies and simplifies loading of the press to facilitate loading by automatic machinery.

However, the one step stamping process introduces several new problems. The number of conductor pairs in an armature is usually an odd number and, hence, the number of steps in the notching press is likewise odd. If the alignment holes are formed coinciding with the steps in the notching press it is impossible to form diametrically opposed alignment holes. This problem is overcome by forming at least two alignment holes which are not diametrically opposed but such that the perpendicular bisector of the line passing through the centers of the alignment holes provides a flip-line passing through the center of the conductor pattern. A preferable pattern includes four alignment holes arranged to form an isosceles trapezoid. The vertical center line of the isosceles trapezoid passes through the center of the conductor pattern and is therefore suitable for use as the flip-line for inverting one stamping relative to the associated stamping.

Another problem is created by the need for accurate alignment by the drive members required for accurately rotating the blank in the notching press. When a square drive hole is utilized, the blank is essentially driven by means of a single drive shaft engaging the square hole. However, when driving the blank without the square drive hole, the blank is driven while clamped between a pair of rotating members. The drive shaft must be precisely aligned with the stamping die, and for practical purposes, the dies must be interchangeable. The problem is overcome by having a main drive shaft journaled in the interchangeable stamping die, this main drive shaft including spurs which dig into the blank to provide absolute engagement. The cooperating rotating member which provides the clamping pressure includes a specially designed universal joint which eliminates eccentricity between the rotating members.

BRIEF DESCRIPTION OF THE DRAWINGS

Illustrative embodiments of the invention are set forth in the following detailed description, the drawings forming part of this specification and wherein:

FIGURES 4A and 4B illustrate the two-layer subassemblies which provide, respectively, the wave and lap segments for a four-layer armature;

FIGURE 4C is a perspective view illustrating the manner in which four successive conductor segments are interconnected in a four-layer armature;

DETAILED DESCRIPTION

The armature in a disc type machine includes a large number of generally radially extending conductor segments distributed evenly about an annular area which is adjacent the magnetic pole faces in the completed machine. These conductor segments are interconnected to form a continuous closed armature winding. Successive conductor segments are displaced by a distance approximately equal to the distance between adjacent pole centers of the associated magnetic structure and are interconnected so that current flow is in one direction across the north magnetic poles and in the opposite direction across the south magnetic poles.

The armature can include either two layers of conductor segments insulated by a suitable dielectric carrier, or can include a larger number of layers, as for example, four layers. The winding of a two-layer armature is preferably in a wave configuration since the wave winding provides higher operating potentials for the motor. In armatures including more than two layers, two of the layers are preferably in a wave configuration whereas the remaining layers are preferably in a lap configuration.

Two-layer armature stampings

Figure 1A:
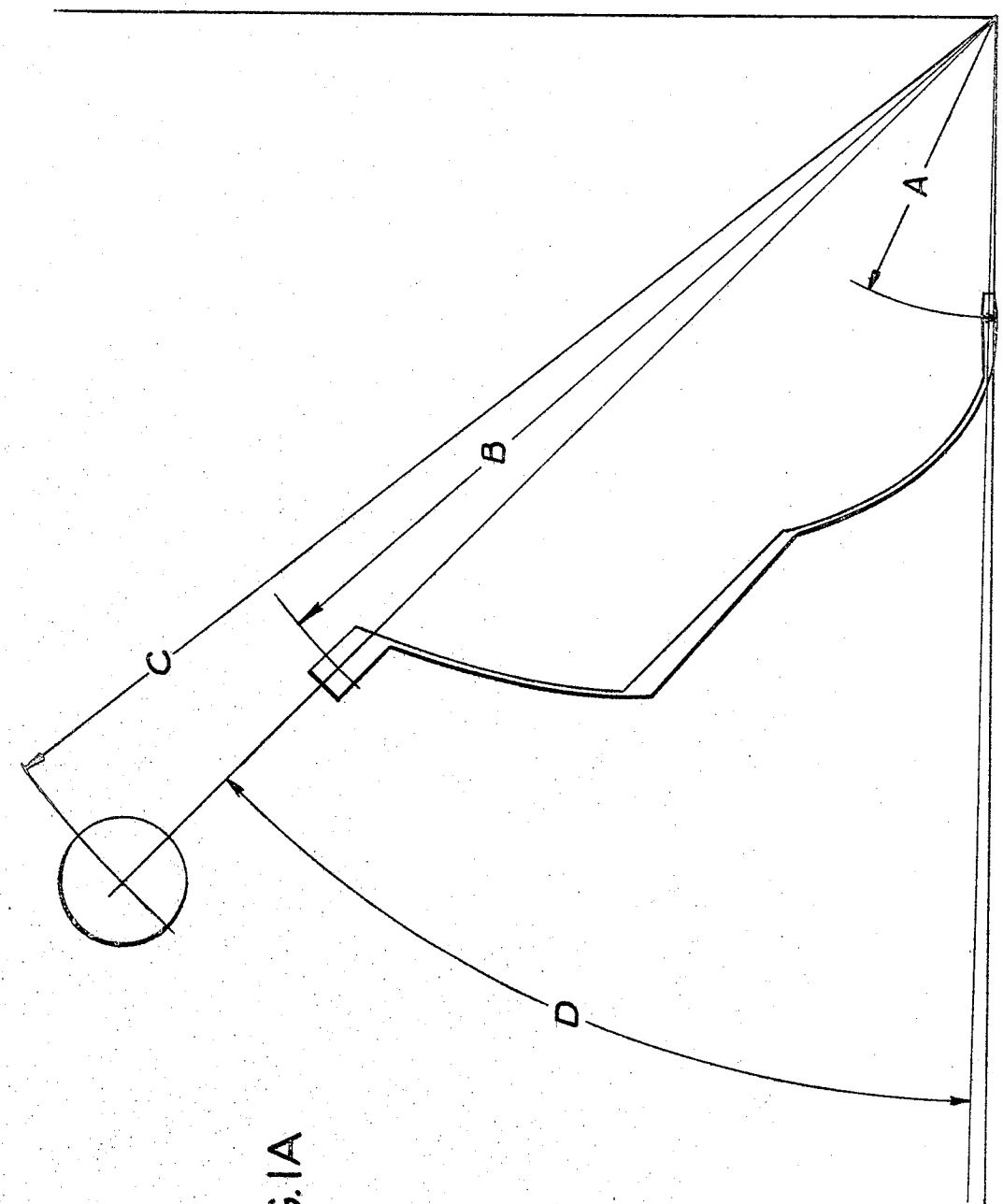
FIGURES 1A and 1B illustrate, respectively, the stamping die pattern and the resulting stamping used in making two-layer armatures.
Figure 1B:
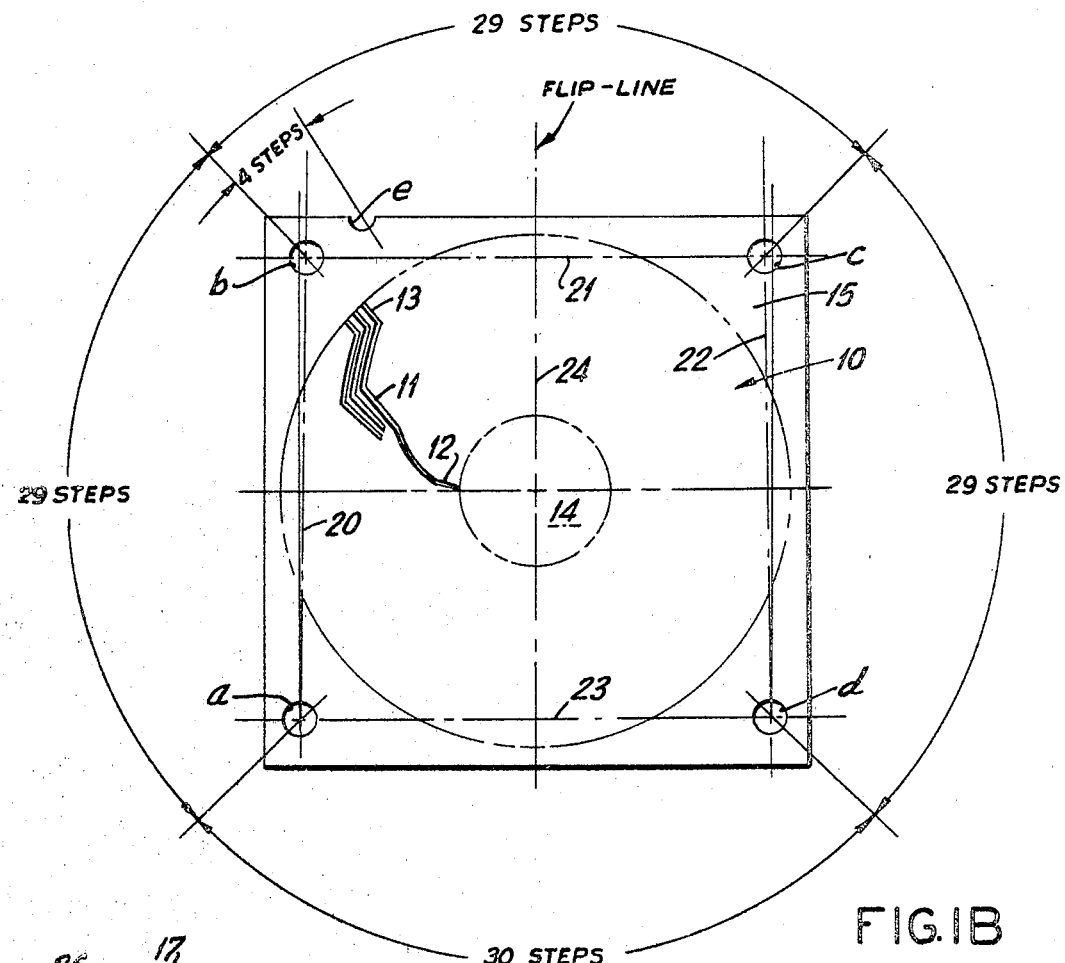

FIGURE 1A illustrates the configuration of the stamping die used in a notching press to punch out the metal between adjacent conductor segments and to punch out alignment holes, for a two-layer armature. FIGURE 1B illustrates the resulting stamping including an annular conductor pattern 10, partially shown, wherein the individual conductor segments 11 have a wave configuration. For a wave winding the angular displacement between the inner and outer tabs 12 and 13 of a conductor segment is approximately equal to the distance between adjacent pole centers of the associated stator, the actual displacement differing slightly therefrom to provide a slight indexing of the winding with each successive armature coil. In the stamping, the individual conductor segments are joined by means of scrap material 14 in the center and scrap material 15 surrounding the conductor pattern. The alignment holes a, b, c and d are located in the scrap material 15 surrounding the conductor pattern.

Figure 2:
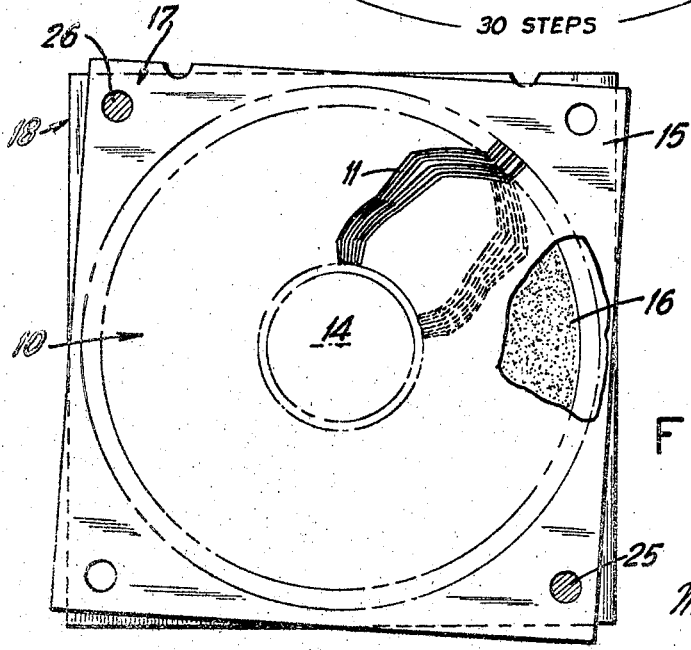
FIGURE 2 shows a pair of stampings forming the two layers of the armature after bonding to a dielectric.

The two-layer armature is assembled using a pair of identical stampings bonded to a dielectric disc carrier 16 as shown in FIGURE 2. One of the stampings 17 is rightside up whereas the other stamping 18 is upside down, or in other words, rotated 180 degrees about a center line referred to as the flip-line. The conductor pattern must be perfectly aligned relative to the flip-line so that in subsequent operations the tabs at the ends of the conductor segment can be interconnected such as by welding.

The inner and outer tabs of the two-layer conductor pattern must be symmetrically disposed relative to the flip-line. With an eight pole machine, for example, the conductor pattern has an odd number of conductor segments and, hence, a tab on one side of the pattern lies on the flip-line whereas the associated tabs on the other side of the pattern straddle the flip-line.

The conductor pattern in accordance with this invention is produced by indexing a metal blank through a predetermined number of stamping positions and by simultaneously punching out the material between the conductor segments. Since for an eight pole machine there are an odd number of conductor segments, and therefore an odd number of stamping positions, it is impossible to obtain diametrically opposed alignment holes for establishing the flip-line. The notching press is therefore programmed to punch the alignment holes at selected stamping positions such that lines can be drawn passing through the alignment hole centers to form an isosceles trapezoid as shown formed in FIGURE 1B by lines 20-23.

With the conductor pattern shown in FIGURES 1B there are 117 conductor segments in the pattern formed by indexing the metal blank through 117 positions. Assuming the stamping begins at a position corresponding to a first alignment hole $a$, the second, third and fourth alignment holes $b$, $c$ and $d$ are each spaced by 29 steps or punching positions. The spacing between the fourth alignment hole $d$ and the first alignment hole $a$ is then 30 steps, and hence, the lines 20-23 passing through the centers of alignment holes $a$-$d$ form an isosceles trapezoid. The center line of the trapezoid establishes the flip-line 24.

In the assembly of the armature, as shown in FIGURE 2, the lower stamping 18 is positioned by a pair of alignment pins 25 and 26 passing respectively through holes $a$ and $c$. The upper stamping 17 is positioned with the same alignment pins passing respectively through holes $d$ and $b$. As a result, one stamping has been rotated 180 degrees about the flip-line relative to the other stamping and the flip-lines of the two conductor patterns coincide and accurately align the tabs 12 and 13 at the ends of the conductor segments.

The conductor patterns can similarly be aligned by a pair of positioning pins passing through an adjacent pair of alignment holes such as $a$ and $d$. The orientation of the conductor patterns is established relative to the same flip-line and the same alignment results are achieved. However, alignment holes $b$ and $c$ can be eliminated from the stamping.

Hence, the basic relationship between the alignment holes and the conductor pattern is (1) that the perpendicular bisector of the line passing through the centers of a pair of alignment holes, such as $a$ and $d$, must establish a flip-line passing through the center of the conductor pattern and (2) for a two-layer armature, the inner and outer connection tabs at the ends of the conductor segments must be symmetrically disposed relative to the flip-line.

The arrangement with four alignment holes and positioning pins located at opposite corners of a trapezoid is preferable, since this arrangement provides a maximum distance between positioning pins and thereby provides the most accurate alignment. Furthermore, this arrangement provides an extra set of alignment holes which may be used in subsequent assembly operations.

Other arrangements with three or more alignment holes are also possible provided the lines passing through the centers of the alignment holes provide a polygon which is symmetrical relative to a flip-line.

Hole $e$ is placed in the stamping as a reference to indicate the short parallel side of the trapezoid.

The conductor patterns are bonded to a dielectric carrier 16. Thereafter, the scrap material at the center of the blank and the scrap material surrounding the conductor patterns are removed to expose the connection tabs which are then welded together to complete the armature winding. The armature winding is then mounted on a suitable hub structure and positioned within a motor housing so that the armature conductors are adjacent the magnetic pole faces of the stator.

The die configuration for the punching operations is as illustrated in FIGURE 1A and is used to provide the alignment holes and to form the conductor pattern in accordance with established dimensions A–D. Dimensions A and B establish the inner and outer diameters of the conductor pattern. Dimension C establishes the radial distance of the alignment holes from the center of the conductor pattern. Dimension E establishes the angular displacement between the inner and outer tabs of a particular conductor segment which is in accordance with the distance between adjacent pole centers of the stator, but differs slightly therefrom to provide retrogressive indexing of the winding.

Four-layer armature stampings

Figure 3A:
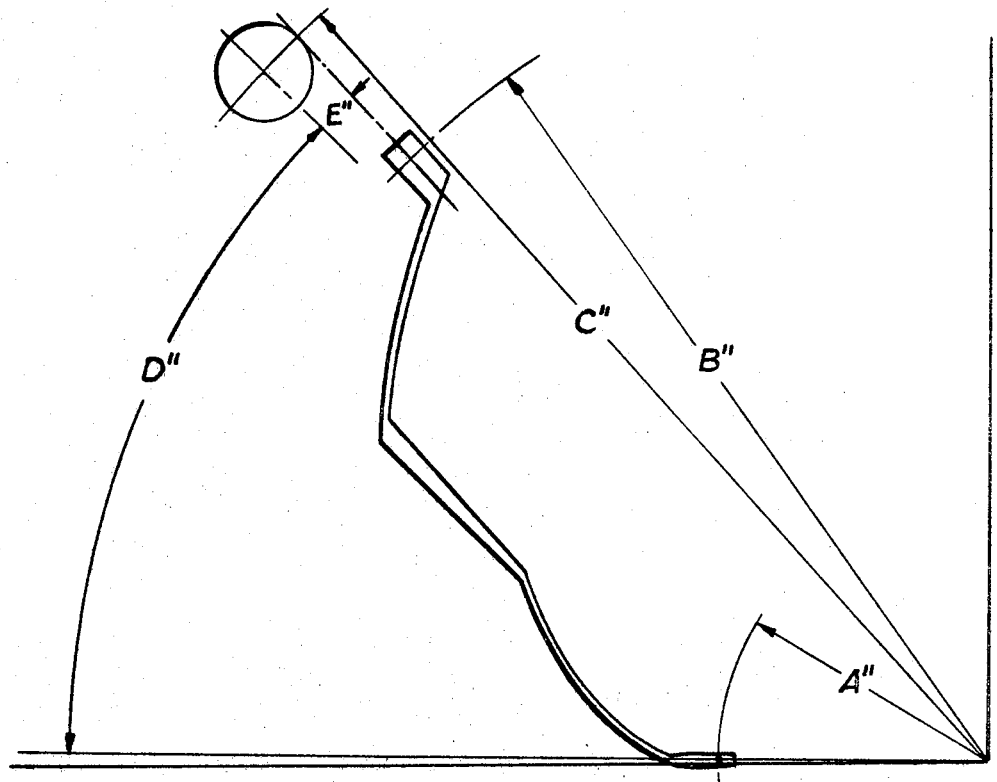
FIGURES 3A and 3B illustrate, respectively, the stamping die pattern and the resulting stamping which provide the wave segments for a four-layer armature.
Figure 3B:
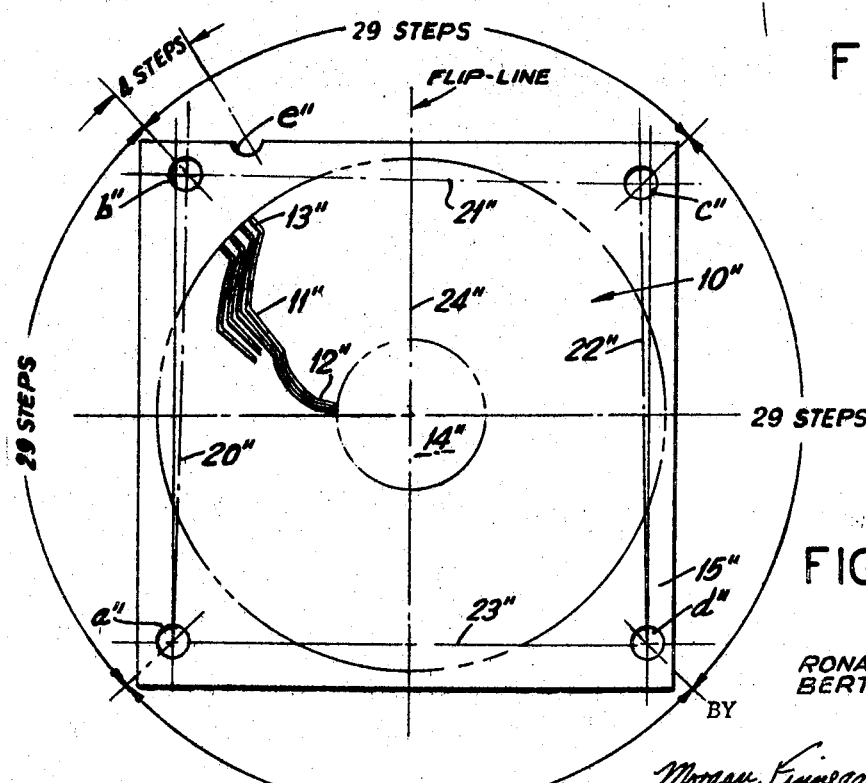
Figure 3C:
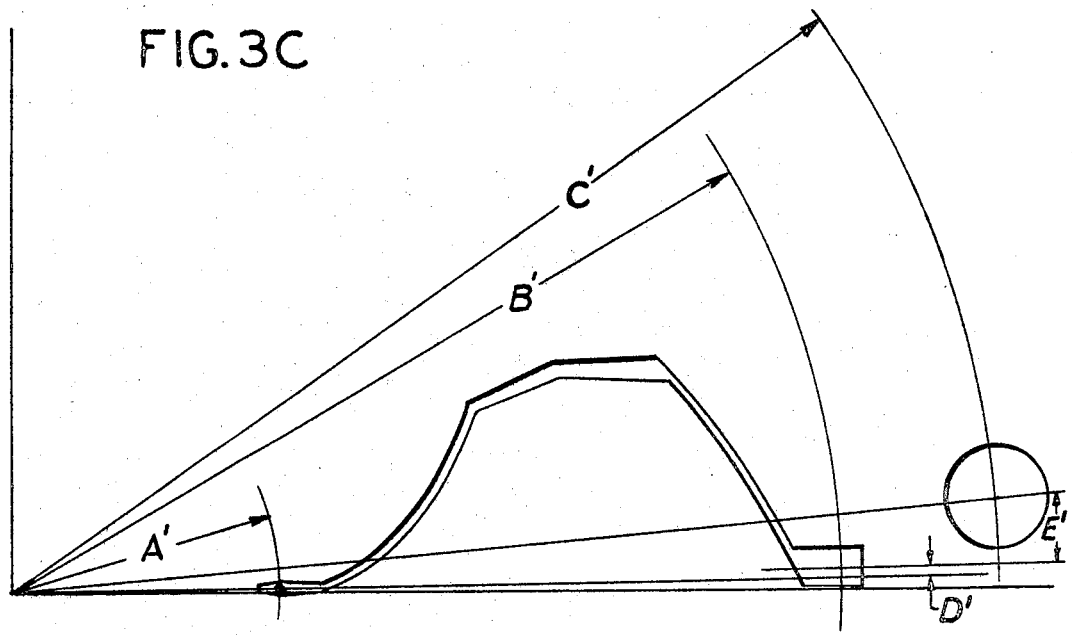
FIGURES 3C and 3D illustrate, respectively, the stamping die pattern and the resulting stamping which provide the lap segments for a four-layer armature.
Figure 3D:
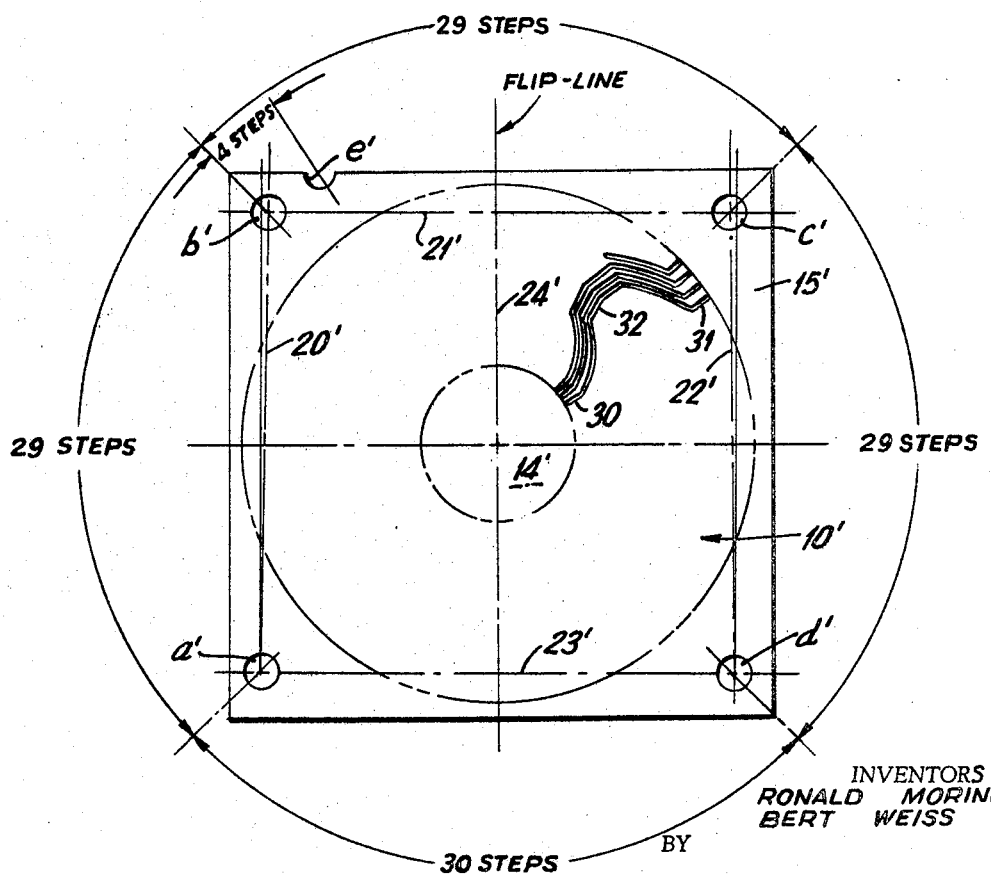
Figure 5:
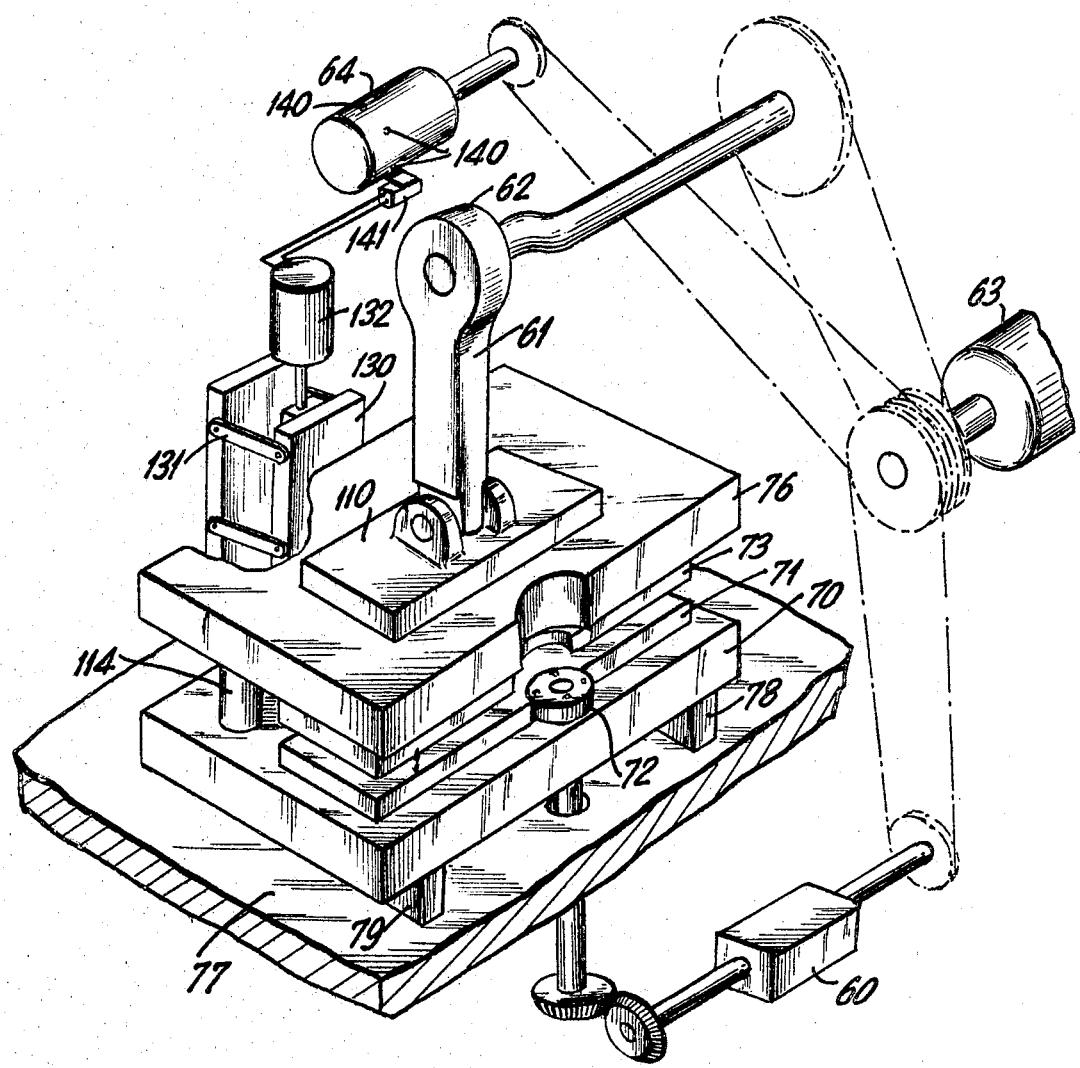
FIGURE 5 is a perspective view illustrating the stamping die and associated portions of the notching press.

A four-layer armature is constructed using a pair of stampings providing wave winding segments such as shown in FIGURE 3B, and a pair of stampings providing lap winding segments such as shown in FIGURE 3D. The layout for the respective punching dies are shown in FIGURES 3A and 3C.

The die and the stamping used in forming the wave segments of the four-layer armature are similar to those previously described for the two-layer armature. However, the portion of the die which punches out the alignment holes is not on the same center line as that portion of the die used in punching out the material between the outer tabs of the conductor pattern, but instead is offset by an angular displacement E" which is equal to one-quarter of the distance between adjacent outer tab centers. In the completed stamping the outer tabs are not symmetrically positioned relative to the flip-line, but instead are offset by one-quarter step. The inner tabs, however, are symmetrically disposed relative to the flip-line.

The stamping for the lap segments of the winding is illustrated in FIGURE 3D wherein the inner and outer tabs 30 and 31 of a particular conductor segment, such as 32, are in approximate radial alignment. The center portion of the conductor segment is displaced therefrom by approximately one-half the distance between pole centers. There is a slight misalignment between the portions of the die which punch out the metal between the inner tabs in relation to the portion of the die which punches out the metal between the outer tabs. The punching die is aligned relative to the alignment holes so that the inner tabs are symmetrically disposed relative to the flip-line whereas the outer tabs are offset from the flip-line by one-quarter step.

A pair of stampings such as shown in FIGURE 3B are bonded to opposite sides of a dielectric disc 33 as shown in FIGURE 4A to provide a two-layer subassembly for providing the wave conductor segments for the winding. The lower stamping 34 is aligned by positioning pins 36 and 37 passing through alignment holes $a''$ and $c''$ while the upper stamping 35 is inverted and aligned by passing the positioning pins through alignment holes $b''$ and $d''$.

Since the inner tabs are symmetrically disposed relative to the flip-line, the inner tabs of the two-layer subassembly are aligned and ready for interconnection by means of a welding operation. Thus, the two-layer subassembly is completed by bonding the conductor patterns to the dielectric disc, by then punching out the scrap material at the center and by then joining the inner tabs by welding.

A two-layer subassembly for the lap segments of the armature is formed in a similar fashion utilizing a pair of stampings as shown in FIGURE 3D bonded to opposite sides of a dielectric disc 40 as shown in FIGURE 4B. The lower stamping 38 is aligned by means of positioning pins 41 and 42 passing through alignment holes $a'$ and $c'$ and the upper stamping 39 is inverted and aligned by passing the positioning pins through alignment holes $b'$ and $d'$. This two-layer subassembly is likewise completed by removing the scrap material at the center to expose the aligned inner tabs, which are thereafter interconnected by welding.

The outer tabs are displaced from the flip-line by one-quarter step and therefore when the two-layer subassemblies are completed the outer tabs of one layer lie centered between a pair of tabs of the other layer. The alignment holes passing through the two-layer subassemblies are used for positioning one subassembly relative to the other. When appropriately positioned, the outer tabs of the top layer are aligned with the outer tabs of the bottom layer, and the outer tabs of the center layers are likewise aligned. The two-layer subassemblies are bonded to another dielectric disc, the scrap material surrounding the conductor patterns is removed, and the outer tabs are then interconnected by welding.

The interconnections of the conductor segment of the completed four-layer armature are illustrated in FIGURE 4C. A wave segment 50 in the upper center layer is connected to a lap segment 51 in the lower center layer by means of the interconnection via outer tabs 52 and 53. The center portions of these conductor segments are spaced in accordance with the distance between pole centers and provide one armature coil.

Conductor segment 51 is in turn connected to a lap segment 54 in the bottom layer via the interconnection of inner tabs 55 and 56 and this lap segment in turn is connected to a wave segment 57 in the top layer via outer tabs 58 and 59 thereby forming a second armature coil. The remaining segments in the four layers are interconnected in similar fashion to provide a continuous closed armature winding.

Stamping apparatus

The stampings for the armatures are formed on a conventional notching press which is specially adapted to accept interchangeable dies and other equipment which facilitate formation of the conductor patterns and alignment holes within a single stamping operation.

A conventional notching press includes an indexing drive 60 which provides rotation in a predetermined number of precise increments. For the particular armatures under consideration, the indexing mechanism is selected to provide 117 stamping positions spaced from one another exactly by 360/117 degrees. The punch drive rod 61 is driven via an eccentric coupling 62 by the same motor 63 as used for driving the indexing drive so that there will be one punching stroke corresponding to each stamping position. A program drum 64 is also driven by motor 63 to count the number of punching strokes and automatically stop the press when punching operation is complete, i.e., after 117 strokes.

The interchangeable die sets for the notching press are constructed in accordance with desired conductor patterns as, for example, shown in FIGURES 1A and 3A and 3C. The lower stationary portion of the die set includes a base plate 70, a die plate 71 and the drive shaft 72 for rotating the blank. The upper movable portion of the die set includes a stripper plate 73, the punches 74 and 75, and the punch plate 76.

The base plate is positioned parallel to the horizontal bolster plate 77 which is part of the notching press, the desired position being achieved by suitable spacers 78 and 79. Drive shaft 72 is journaled in the base plate by means of a hardened bushing 80. The drive shaft, which is part of the die set is coupled to a drive socket 81 of the notching press by means of a long screw 82 passing through the drive shaft and into the conical center portion of the drive socket to provide a positive frictional engagement.

When screw 82 tightens the drive shaft into position, the coupling between drive shaft 72 and socket 81 determines the position of the die set upon bolster plate 77 and, hence, the interchangeable die sets are easily positioned in the notching press.

Figure 7:
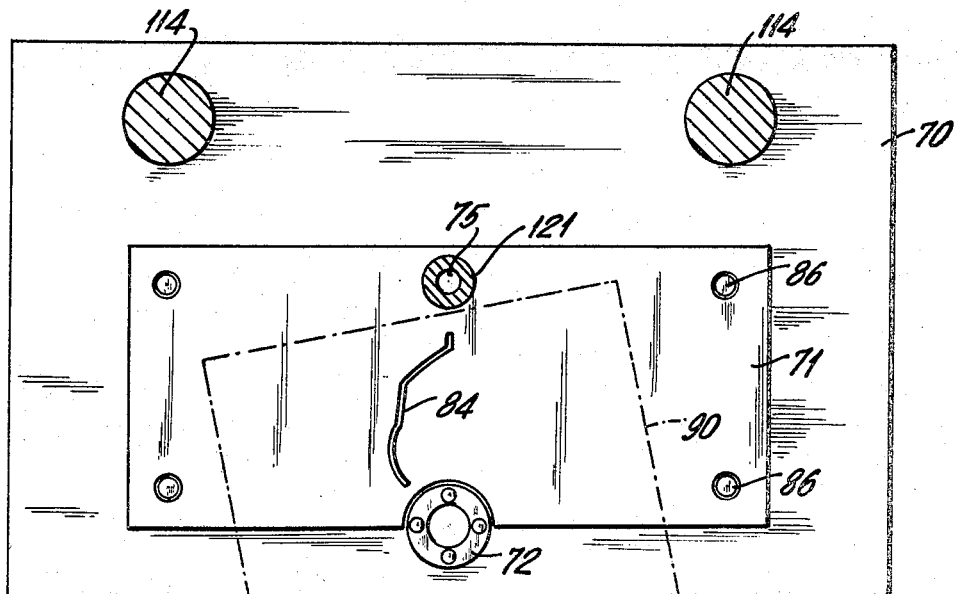
FIGURE 7 is a plan view taken along line 7—7 in FIGURE 6C illustrating the stripper plate.

Die plate 71 includes a slotlike aperture 84 (FIGURE 7) having a configuration precisely conforming to the desired configuration of the spacing between conductor segments of the conductor pattern. In other words, the configuration of the slotlike aperture conforms to one of the die patterns illustrated in FIGURES 1A, 3A and 3C. An aperture is also provided in the die plate associated with punch 75 for the alignment holes, this aperture being defined by a hardened bushing 85 set into the die plate. The die plate is rigidly secured to base plate 70, and precisely positioned relative to the center of rotation of the drive shaft, by suitable machine bolts 86 passing up through the base plate. Die plate 71 and drive shaft 72 are both securely mounted relative to base plate 70, and it is therefore possible to achieve a high degree of precision in the stamping pattern.

A metal blank 90 is clamped between the drive shaft and a cooperating universal clamp member 91 (FIGURES 10A and 10B), the latter being secured to the press so that even though the die sets are interchangeable, there is only need for a single universal clamp member. In this manner, (1) the need for a prepunching step for providing a square drive hole is eliminated; (2) the need for accurate alignment of the metal blank as is inserted into the press is eliminated; and (3) automatic loading and unloading of the blanks becomes feasible.

As was previously mentioned, the drive shaft is built into the die set in order to maintain a precise relationship between the punches forming the conductor patterns and the center of rotation as determined by the drive shaft. Cooperating rotating clamp member 91 is not secured to the die set, but instead is secured to the press and, therefore, a slight misalignment may occur between the centers of rotation which in turn may bring about a slight eccentricity in the rotation of the metal blank. The eccentric rotation of the blank would destroy the accuracy of the conductor pattern. To eliminate this problem, the rotating clamp member is constructed as shown in FIGURE 10A so that it becomes a slave to the drive shaft and rotates about precisely the same center.

Figure 10A:
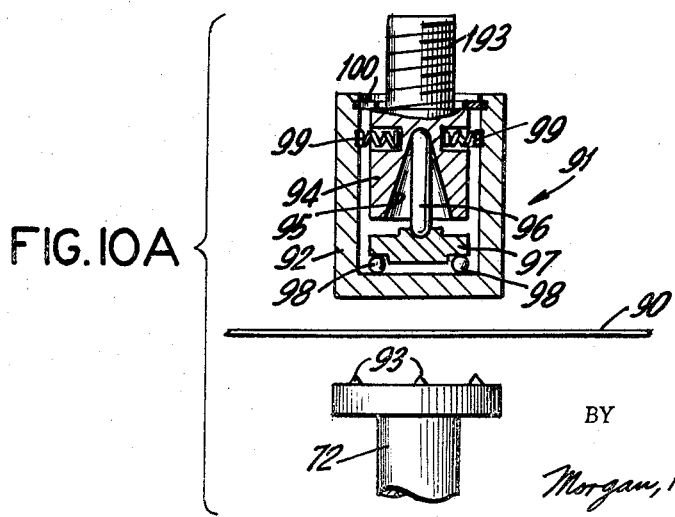
FIGURE 10A is a cross sectional view of the universal clamping member in relation to the drive shaft.

As shown in FIGURE 10A, metal blank 90 is positioned between drive shaft 72 and the cooperating pressure shoe 92. A number of spurs 93 are mounted in the upper surface of the drive shaft and are adapted to dig into metal blank 90 to provide a positive engagement. Pressure shoe 92 is a generally cup shaped member urged toward the drive shaft by means of pressure supplied via a thrust rod 193. A cylindrically shaped socket 94 is secured to the lower end of rod 193 and includes a conical opening 95, extending from the lower surface, which provides a seat for a pivot rod 96. The other end of the pivot rod rests in a suitable recess in the upper surface of a bearing plate 97. An angular recess is machined about the lower edge of the bearing plate to provide an annular cavity for maintaining a plurality of thrust bearings 98 in position between the bearing plate and the pressure shoe. The inner cylindrical surface of the pressure shoe is spaced sufficiently close to the circumferential edge of the bearing plate such that the bearings are retained in the bearing cavity. Four centering springs 99 (two of which are shown in FIGURE 10A) are located in suitable radially extending holes in socket 94 and tend to nominally maintain the pressure shoe centered relative to the socket. A snap ring 100 fits into an annular groove near the top of the pressure shoe and fits over the top of the socket so that the pressure shoe will rise as the thrust rod and socket are withdrawn.

With this coupling the pressure shoe is free to rotate about precisely the same center as the cooperating drive shaft even though this center of rotation is not aligned with the center of thrust rod 193 or socket 94. As a result, the pressure shoe precisely follows the rotation of the drive shaft and does not tend to create an eccentric rotation of the metal blank when there is a misalignment between the thrust rod and the drive shaft.

Figure 10B:
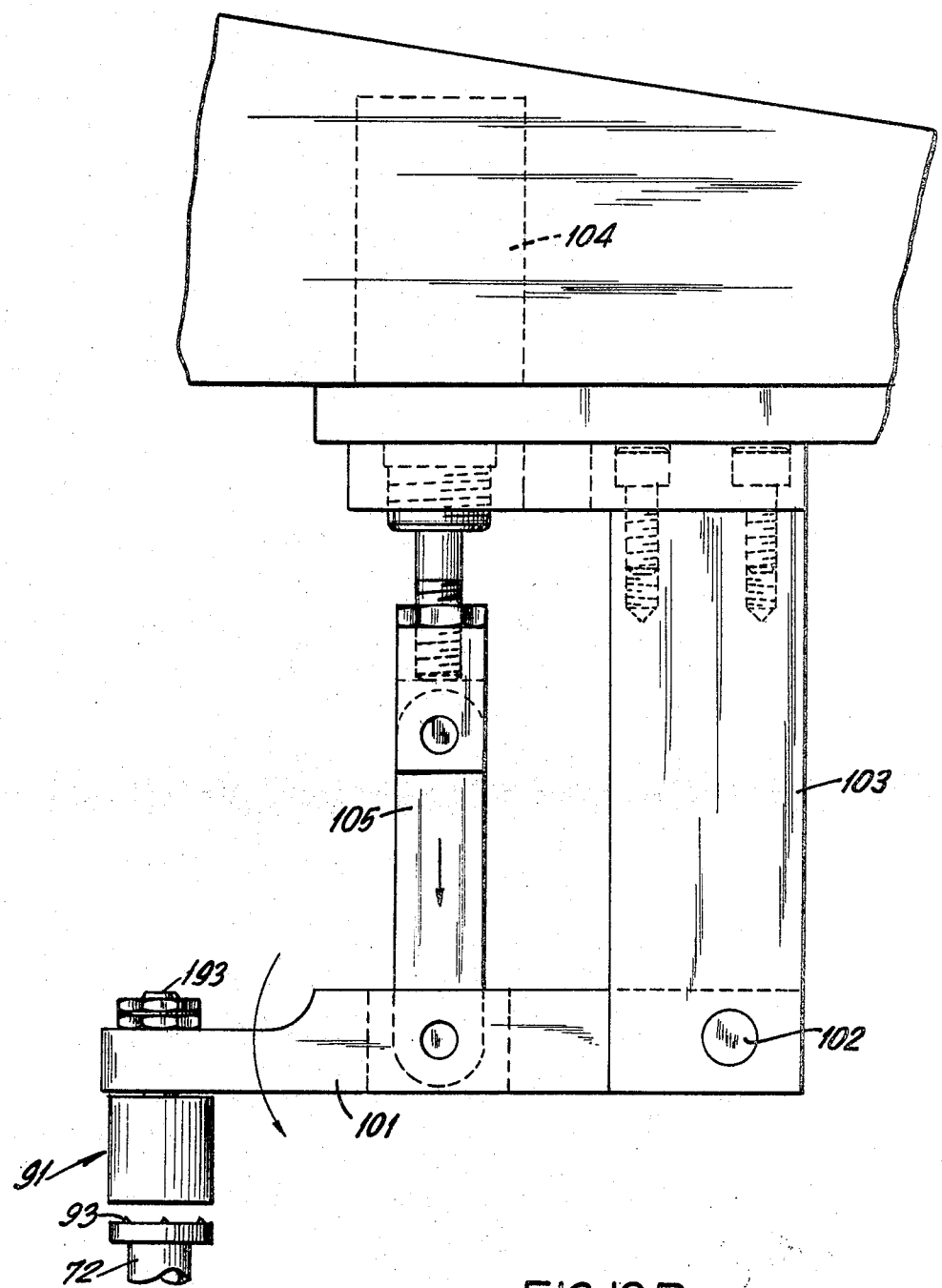
FIGURE 10B is an elevation illustrating the mechanism for urging the clamping member toward the drive shaft.

As shown in FIGURE 10B, thrust rod 193 attached to the universal clamping member 91 is secured at one end of a pivot arm 101 which rotates about a pivot 102 located at the other end, this pivot point being established by a rigid arm 103 secured to the notching press structure. Clamping member 91 is urged downwardly into engagement with the metal blank by means of an air cylinder 104 coupled to the pivot arm by means of a linkage 105.

The movable portion of the die set includes punch plate 76 which is secured to the end of the punching drive rod 61, by means of a clevis coupling 110. Stripper plate 73 is located below the punch plate and is urged away from the punch plate by springs 111. Precision guide bolts 112 are threaded into the stripper plate and slide within associated guide holes in the punch plate. The heads of the guide bolts cooperate with shoulders within the guide holes to establish the maximum distance between the punch plate and stripper plate. The stripper plate includes a slotlike punch opening 113 therein which precisely corresponds to punch opening 84 in the die plate. Punch 74 includes a precisely machined downwardly extending portion which passes through the cooperating slotlike punch openings in the stripper and die plates.

Figure 6A:
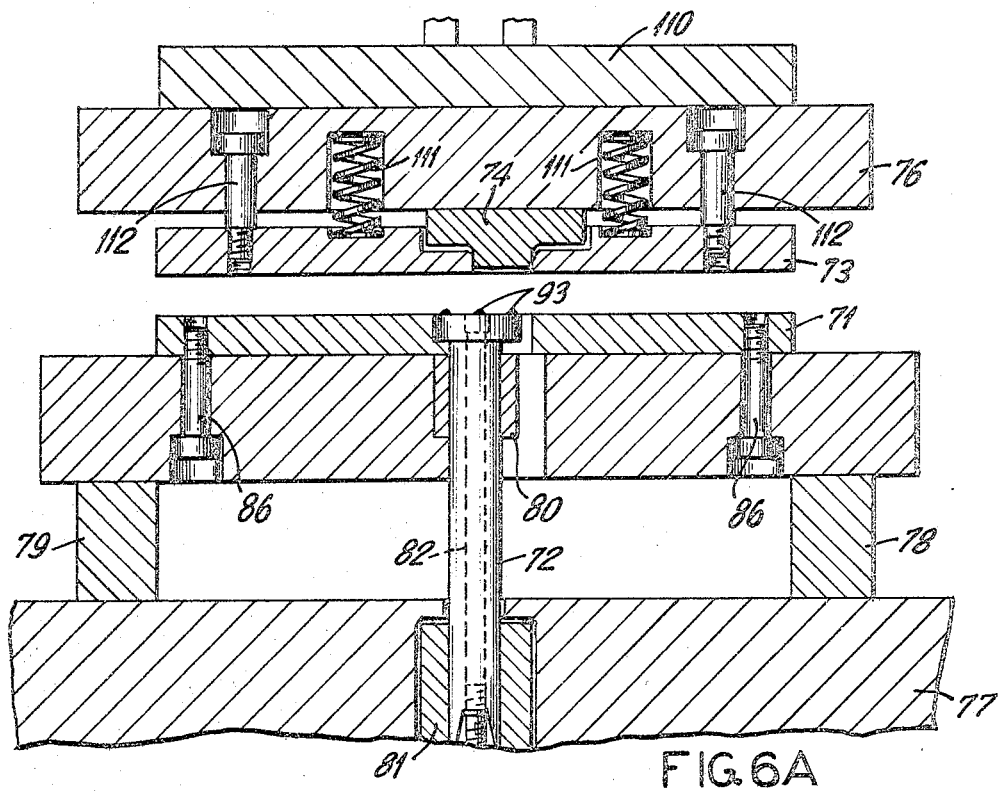
FIGURES 6A-6C are cross sectional views of the stamping die in various positions.
Figure 6B:
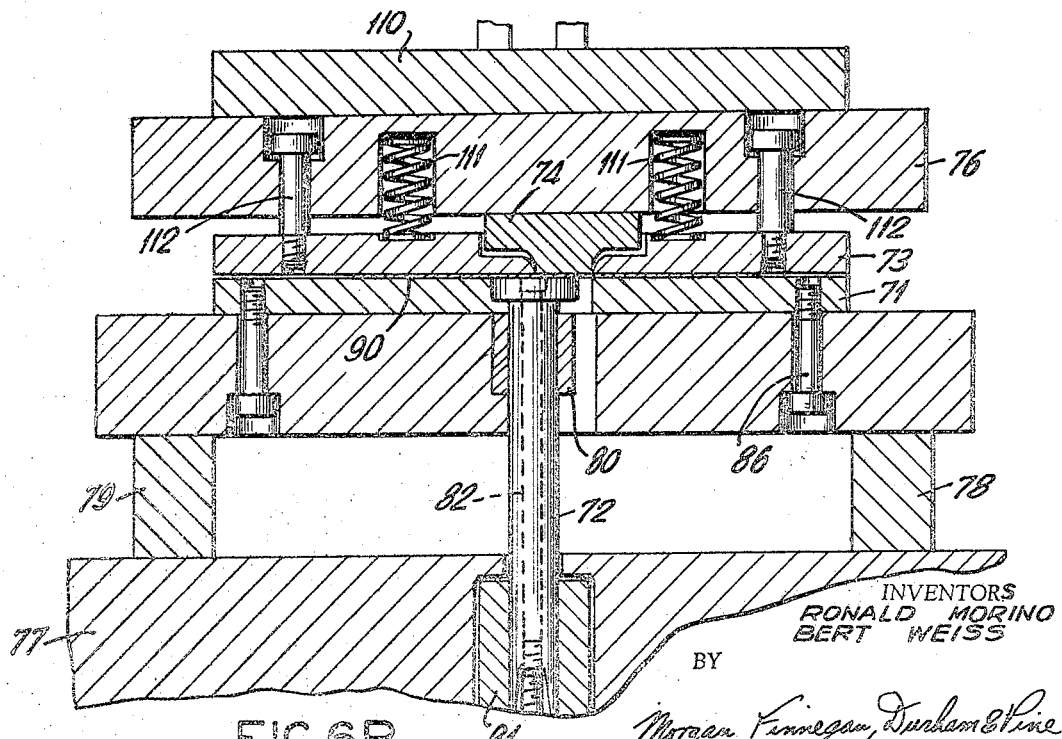
Figure 6C:
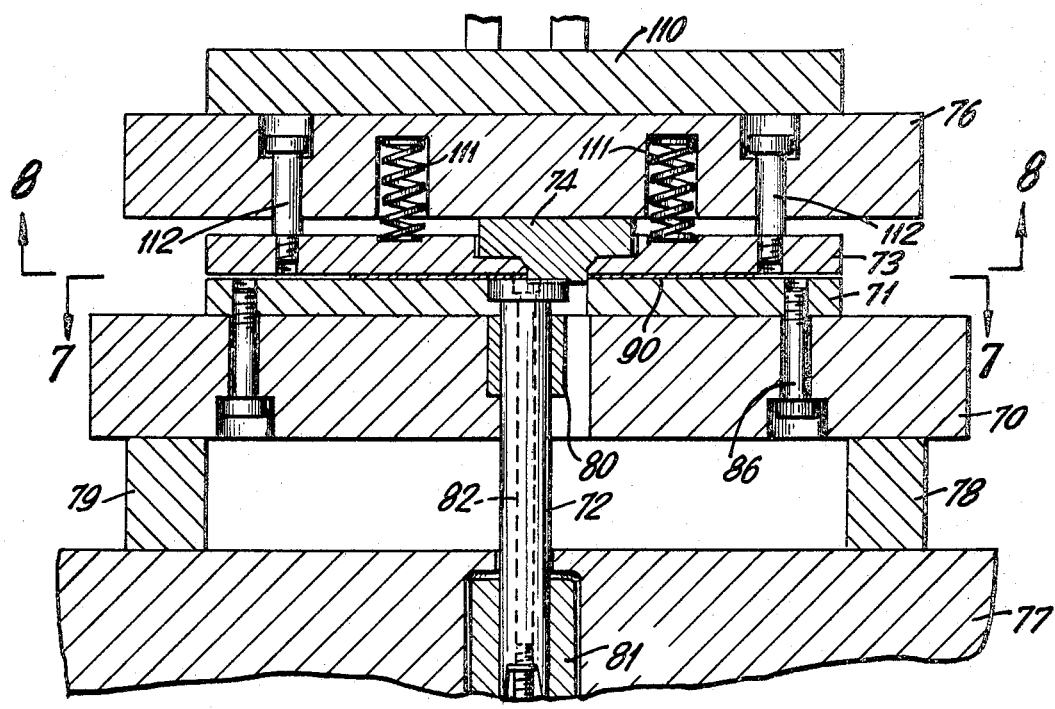

When the die set is in the open position as shown in FIGURE 6A, the stripper plate is raised above the die plate and the extended portion of punch 74 is withdrawn into the punch opening of the stripper plate. In this position the metal blank can be inserted. As the movable portion of the die set is forced downwardly, the stripper plate engages the metal blank and clamps it against the die plate as shown in FIGURE 6B. Further downward movement forces punch 74 through punch opening 113 in the stripper plate, through metal blank 90, and into punch opening 84 in the die plate thereby removing the metal between adjacent conductor segments of the conductor pattern. This position of the die set is illustrated in FIGURE 6C.

Thereafter the movable portion of the die set begins to rise permitting the punch to withdraw, but, due to the action of springs 111, the stripper plate continues to clamp the metal blank and therefore strips the blank off the punch. When the maximum space between the punch plate and the stripper plate is reached, as determined by guide bolts 112, the stripper plate begins to rise and releases the metal blank. The blank is then indexed to the next stamping position and the punching operation is repeated.

A circular punch 75 (FIGURES 8 and 9) is used for punching the alignment holes in the metal blank. Punch 75 passes through corresponding punch openings in the stripper plate and die plate, these openings being defined, respectively, by a guide punch sleeve 120 and a hardened die plate bushing 121. A spring 122 is located in a recess in punch plate 76 and applies downward pressure to the top of the punch through a pin 123. The spring pressure is not sufficient to cause the punch to pass through the metal blank and, hence, the punch is normally floating and inoperative.

Figure 8:
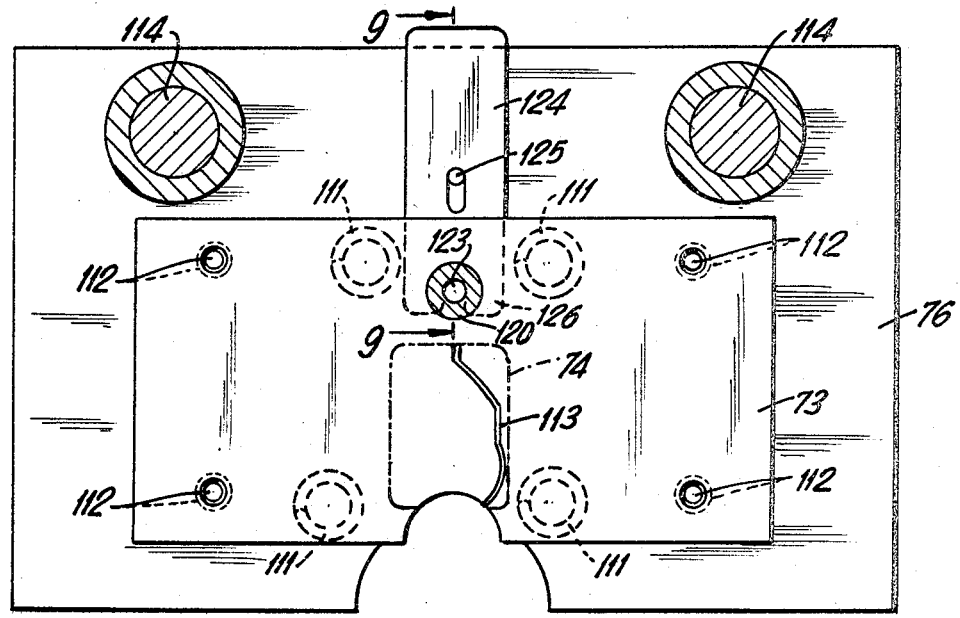
FIGURE 8 is a plan view taken along line 8—8 in FIGURE 6C illustrating the die plate.
Figure 9:
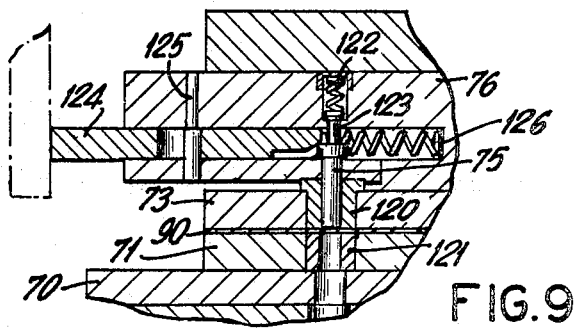
FIGURE 9 is a cross sectional view taken along line 9—9 in FIGURE 6C illustrating the alignment hole punch.

The punch is activated by an interference plate 124. The interference plate is coupled to the punch plate by a pin 125 and cooperating slot arrangement which permits movement from a withdrawn position as shown in FIGURE 9 to an advanced position as shown in FIGURE 8. In the advanced position, the bifurcated end portion 126 surrounds pins 123 such that the bifurcated end of the interference plate rests on top of punch 75. When interference plate is in the advanced position, downward movement of the punch plate is transmitted to the punch via the interference plate thereby forcing the punch through the metal blank to form the alignment holes.

The interference plate is advanced by means of a pressure plate 130 which is attached to the notching press by means of a parallelogram type linkage 131. An air cylinder 132 is coupled to the pressure plate so that, when activated, the piston moves downwardly thereby urging the pressure plate toward the die set in turn urging the interference plate into engagement with the alignment hole punch.

Program drum 64 has pins 140 inserted therein at positions corresponding to selected stamping positions at which the alignment holes are to be punched. These pins actuate a microswitch 141 which in turn actuates air cylinder 132. Thus, the alignment holes are punched at selected ones of the stamping positions as determined by the program established by the pin positions in the program drum.

The invention is not limited to the specific illustrative embodiments set forth herein as there are many alternative arrangements within the scope of the invention. The invention is more particularly defined in the appended claims.

What is claimed is:

1. A method of making a multilayer armature for electric motors comprising,
    forming two identical conductor patterns by
        clamping a metal blank to an indexing drive shaft,
        indexing the blank through a predetermined number of stamping positions,
        punching the blank at each of said stamping positions to form a conductor pattern by removing the metal between adjacent conductor segments, and
        punching at least two alignment holes in the blank concurrently with the punching of said blank at a stamping position so that the perpendicular bisector of the line passing through the centers of the alignment holes provides a flip-line passing through the center of the conductor pattern, and orienting said punching so that the ends of the conductor segments are disposed symmetrically relative to said flip-line;
    rotating one of said conductor patterns relative to the other through an angle of 180 degrees about said flip-line; and
    interconnecting the conductor segments of said conductor patterns to form a closed armature winding.

2. The method according to claim 1 wherein after rotating one conductor pattern relative to the other the conductor patterns are bonded to a dielectric disc, the scrap material of the blank is removed from the conductor pattern to expose tabs at the ends of the conductor segments, and wherein said interconnections are formed by welding said exposed tabs.

3. The method according to claim 1 wherein said interconnections of the conductor segments are completed through at least two additional conductor patterns.

4. The method according to claim 1 wherein positioning pins are passed through said alignment holes so that the flip-lines of said conductor patterns are aligned after one of said conductor patterns is rotated relative to the other.

5. A method of forming a two layer armature for electric motors comprising
    forming two identical wave conductor patterns by
        clamping a metal blank to an indexing drive shaft,
        indexing the blank through a predetermined number of stamping positions,
        punching the blank at each of said stamping positions to form a conductor pattern therein by removing the metal between adjacent conductor segments of the pattern,
        punching at least two alignment holes in the blank concurrently with the punching of said blank at a stamping position so that the perpendicular bisector of the line passing through the centers of the alignment holes provides a flip-line passing through the center of the conductor pattern, orienting said punchings so that tabs at the ends of the conductor segments are disposed symmetrically relative to said flip-line;
    rotating one of said conductor patterns relative to the other through an angle of 180 degrees about said flip-line;
    passing positioning pins through said alignment holes so that said tabs align, and
    interconnecting said conductor patterns via the aligned tabs.

6. The method according to claim 5 wherein the conductor patterns are bonded to a dielectric disc, the scrap material is then removed from the conductor pattern and the tabs are interconnected by welding.

7. A method of forming a four-layer armature for electric motors comprising
    forming two identical wave conductor patterns by
        clamping a metal blank to an indexing drive shaft,
        indexing the blank through a predetermined number of stamping positions,
        punching the blank at each of said stamping positions to form a conductor pattern therein by removing the metal between adjacent conductor segments of the pattern,
        punching at least two alignment holes in the blank concurrently with the punching of said blank at a stamping position so that the perpendicular bisector of the line passing through the centers of the alignment holes provides a flip-line passing through the center of the conductor pattern,
        orienting said punchings so that tabs at the inner ends of the conductor segments are symmetrically disposed relative to said flip-line and so that tabs at the outer ends of the conductor segments are asymmetrically disposed relative to said flip-line, displaced from flip-line symmetry by one-quarter the angular distance between adjacent stamping positions;
    rotating one of said wave conductor patterns relative to the other through an angle of 180 degrees about said flip-line;
    interconnecting said wave conductor patterns via the aligned inner tabs to form a two-layer subassembly;
    forming two identical lap conductor patterns with associated alignment holes in like punching operations;
    rotating one of said lap conductor patterns relative to the other through an angle of 180 degrees about the flip-line thereof established by the alignment holes;
    interconnecting said lap conductor patterns via the aligned inner tabs to form a second two-layer subassembly;
    positioning said two layer subassemblies so that all flip-lines coincide;
    interconnecting said subassemblies via the aligned outer tabs.

8. The method according to claim 7 wherein said conductor patterns are bonded to dielectric discs located between adjacent conductor patterns, and wherein said interconnections are formed by welding.

References Cited

UNITED STATES PATENTS

| | | | |
|---|---|---|---|
| 2,920,682 | 1/1960 | Lindberg | 29—463 X |
| 3,095,516 | 6/1963 | Moressee et al. | 310—268 |
| 3,330,032 | 7/1967 | Bedell et al. | 29—598 |
| 3,382,570 | 5/1968 | Knapp et al. | 29—598 |

JOHN F. CAMPBELL, Primary Examiner

CARL E. HALL, Assistant Examiner

U.S. Cl. X.R.

29—406, 407; 83—35, 55